United States Patent
Kang et al.

(10) Patent No.: US 11,927,100 B1
(45) Date of Patent: Mar. 12, 2024

(54) METHOD OF MANUFACTURING LABYRINTH SEALING DEVICE USING VIBRATION AND 3D PRINTING

(71) Applicants: Hyun Ki Kang, Busan (KR); Taek Ho Chung, Busan (KR)

(72) Inventors: Hyun Ki Kang, Busan (KR); Taek Ho Chung, Busan (KR)

( * ) Notice: Subject to any disclaimer, the term of this patent is extended or adjusted under 35 U.S.C. 154(b) by 0 days.

(21) Appl. No.: 18/105,413

(22) Filed: Feb. 3, 2023

(51) Int. Cl.
*B23P 15/04* (2006.01)
*F01D 11/02* (2006.01)
*B33Y 80/00* (2015.01)

(52) U.S. Cl.
CPC .............. *F01D 11/02* (2013.01); *B33Y 80/00* (2014.12); *F05D 2230/21* (2013.01); *F05D 2230/239* (2013.01)

(58) Field of Classification Search
CPC ..... F01D 11/02; B33Y 80/00; F05D 2230/21; F05D 2230/239
See application file for complete search history.

(56) References Cited

FOREIGN PATENT DOCUMENTS

| CN | 106914700 A | * | 7/2017 | .............. B23K 26/21 |
| CN | 110997208 A | * | 4/2020 | ........... B29K 9/1006 |
| KR | 1449473 B1 | * | 10/2014 | |
| KR | 2239315 B1 | * | 4/2021 | |
| WO | WO-2021201828 A1 | * | 10/2021 | ............ F01D 11/025 |

OTHER PUBLICATIONS

English translation of KR101449473 (Year: 2014).*
English translation of KR102239315 (Year: 2021).*
English translation of CN110997208 (Year: 2020).*
English translation of CN106914700 (Year: 2017).*

* cited by examiner

*Primary Examiner* — Jun S Yoo

(57) ABSTRACT

The present invention relates to a method of manufacturing a labyrinth sealing device mounted between a diaphragm and a turbine rotor of a turbine in order to induce smooth rotation of the turbine rotor and prevent a leakage of gas by minimizing friction between a rotor, such as the turbine rotor, and a stator, such as the diaphragm, when the rotor rotates in the stator, wherein the labyrinth sealing device includes a ring-shaped body and a labyrinth part protruding from one surface of the ring-shaped body, the ring-shaped body is manufactured by centrifugal casting or ring mill, and the labyrinth part is manufactured by 3D printing.

The method of manufacturing a labyrinth sealing can improve productivity by reducing material costs and machining costs by manufacturing the labyrinth part (or teeth) protruding from the ring-shaped body using three-dimensional printing after manufacturing the ring-shaped body by centrifugal casting or ring mill. Moreover, the method of manufacturing a labyrinth sealing device can manufacture the labyrinth part in various shapes according to usage environments since the labyrinth part is manufactured by three-dimensional printing. Especially, the method of manufacturing a labyrinth sealing device can achieve microstructure, reduce fusion defects, and improve an adhesive force by bonding the labyrinth part on the body through vibration and far-infrared heating when the labyrinth part is stacked on the body.

1 Claim, 3 Drawing Sheets

(PRIOR ART)

METHOD OF MANUFACTURING LABYRINTH SEALING DEVICE USING VIBRATION AND 3D PRINTING

BACKGROUND OF THE INVENTION

Field of the Invention

The present invention relates to a method of manufacturing a labyrinth sealing device of a turbine and, more specifically, to a method of manufacturing a labyrinth sealing device, which is mounted between a diaphragm and a turbine rotor of a turbine, wherein a body is manufactured by ring mill or centrifugal casting and a labyrinth part which is a protrusion is stacked on the body by ultrasonic vibration using three-dimensional printing.

Background Art

A turbine is a rotary machine that extracts energy from a fluid flow and converts the energy into kinetic energy. There are various types of turbines, for example, a steam turbine using steam, a gas turbine using combustion gas, and the like according to operating principles and structures. [Naver Knowledge Encyclopedia]

In general, in order to produce electric power by using a turbine for power generation, high-temperature and high-pressure steam generated from a boiler flows into a turbine casing through a turbine stop valve and a control valve, and the steam introduced into the casing rotates a moving blade assembled to a turbine rotor via a diaphragm, so that a power generator is rotated by the turbine rotor to obtain electric power.

In this instance, the diaphragm induces the introduced steam or gas to become a steam flow having an optimal steam direction and rotates the moving blade assembled to the turbine rotor.

Because a leakage of steam generated in a sealing part between a rotor such as a turbine rotor and a stator such as a diaphragm surrounding the turbine rotor in the turbine is a main factor which lowers efficiency of the turbine and increases fuel costs, a design technique of a sealing device for reducing a steam leakage is very important.

Here, a sealing device made of a stainless steel material used for a high-temperature and high-pressure turbine, such as a steam turbine or a gas turbine, plays a significant role to increase energy production efficiency of a power generator by preventing the leakage of steam or gas, and to prevent vibration of the rotor due to fluid.

Accordingly, in order to induce smooth rotation of the turbine rotor and prevent the leakage of gas by minimizing friction between the rotor and the stator when the rotor such as the turbine rotor rotates in the stator such as the diaphragm, a non-contact type sealing device is mounted and used between the turbine rotor and the diaphragm.

As a representative non-contact sealing device, there is a labyrinth sealing device.

The labyrinth sealing device includes a ring-shaped body and teeth protruding from one surface of the body. A vortex is formed between the labyrinth and the turbine rotor, thereby maintaining airtightness and facilitating the rotation of the turbine rotor to prevent the turbine rotor from getting in contact with the teeth protruding complicatedly.

As a conventional art of a labyrinth sealing device, Korean Patent No. 10-1442739 (filed on Apr. 8, 2014 and granted on Sep. 15, 2014 by the same applicant of the present invention) discloses a brush sealing device including: a sealing portion provided in the casing of the turbine to seal the flow of a fluid leaking between the casing and a rotor rotating in the casing; a brush portion provided at the sealing portion and including bristles to enclose the outer periphery of the rotor; a shock preventing portion disposed away from a front side of the brush portion at a given interval to block the flow of the fluid flowing along the outer periphery of the rotor; and a bristle plate provided to support the rear side of the brush portion and formed with a plurality of guide holes penetrating to be upward inclined toward the casing side from an inflow direction of the fluid to an outflow direction. The shock preventing portion has a plurality of throttle bosses protruding backward so that the fluid flowing upward along the rear surface opposite to the brush portion is throttled, and a throttle groove connecting each throttle boss disposed vertically in a multiple stage on the shock preventing portion. Each guide hole is disposed in a vertical direction and a circumferential direction of the bristle plate. A fluid inlet portion of the guide hole formed at the uppermost side of the bristle plate is disposed at a height higher than the installation height of the throttle boss formed at the uppermost side of the shock preventing portion.

As another conventional art of a labyrinth sealing device, Korean Patent No. 10-1449473 (filed on May 29, 2014 and granted on Oct. 2, 2014 by the same applicant of the present invention) discloses a brush sealing device for a turbine disposed on a sealing portion provided on the inner periphery of a casing to seal the flow of a fluid between the casing of a turbine and a rotor rotating in the casing. The brush sealing device includes: a shock preventing portion extending to a lower portion of the sealing portion to seal a part of the fluid flowing along the outer circumference of the rotor; a core member disposed on the rear surface of the shock preventing portion; a brush portion disposed such that the front surface thereof is pressed by the rear surface of the core member having a plurality of bristles disposed to enclose the outer periphery of the rotor; a bristle plate to support the rear side of the brush portion; and a pressing member to press the core member to be engaged to the shock preventing portion. The core member has a pressing layer made of a metal material of high hardness pressed by the pressing member, and an elastic layer made of a metal material of low hardness pressed by the pressing layer to be brought into contact with the brush portion.

However, the conventional labyrinth sealing devices have several disadvantages in that manufacturing costs increase due to a severe waste of materials during a process of carving the teeth of the labyrinth with a machining tool after the ring-shaped body is formed by centrifugal casting or ring mill, and in that a manufacturing period is extended and productivity is not good since it is difficult to form the teeth.

PATENT LITERATURE

Patent Documents

Patent Document 1: Korean Patent No. 10-0876603 (granted on Dec. 23, 2008)
Patent Document 2: Korean Patent No. 10-14442739 (granted on Sep. 15, 2014)
Patent Document 3: Korean Patent No. 10-1449473 (granted on Oct. 2, 2014)
Patent Document 4: Korean Patent No. 10-1546385 (granted on Aug. 17, 2015)
Patent Document 5: Korean Patent No. 10-1950924 (granted on Feb. 15, 2019)
Patent Document 6: Korean Patent No. 10-2293186 (granted on Aug. 18, 2021)

SUMMARY OF THE INVENTION

Accordingly, the present invention has been made to solve the above-mentioned problems occurring in the prior arts, and it is an object of the present invention to provide a method of manufacturing a labyrinth sealing device of a turbine, in which a ring-shaped body is manufactured and a labyrinth part protruding from the ring-shaped body is manufactured by using three-dimensional printing, thereby improving productivity by reducing material costs and machining costs. Moreover, it is another object of the present invention to provide a method of manufacturing a labyrinth sealing device of a turbine in which the labyrinth part is bonded through vibration and far-infrared heating when being stacked on the body, thereby achieving microstructure, reducing fusion defects, and improving an adhesive force.

To accomplish the above object, according to the present invention, there is provided a method of manufacturing a labyrinth sealing device mounted between a diaphragm and a turbine rotor of a turbine in order to induce smooth rotation of the turbine rotor and prevent a leakage of gas by minimizing friction between a rotor, such as the turbine rotor, and a stator, such as the diaphragm, when the rotor rotates in the stator, wherein the labyrinth sealing device includes a ring-shaped body and a labyrinth part protruding from one surface of the ring-shaped body, the ring-shaped body is manufactured by centrifugal casting or ring mill, and the labyrinth part is manufactured by 3D printing.

As described above, the method of manufacturing a labyrinth sealing device of a turbine according to the present invention can improve productivity by reducing material costs and machining costs by manufacturing the labyrinth part (or teeth) protruding from the ring-shaped body using three-dimensional printing after manufacturing the ring-shaped body by centrifugal casting or ring mill. Moreover, the method of manufacturing a labyrinth sealing device can manufacture the labyrinth part in various shapes according to usage environments since the labyrinth part is manufactured by three-dimensional printing. Especially, the method of manufacturing a labyrinth sealing device can achieve microstructure, reduce fusion defects, and improve an adhesive force by bonding the labyrinth part on the body through vibration and far-infrared heating when the labyrinth part is stacked on the body.

DETAILED DESCRIPTION OF THE PREFERRED EMBODIMENT

Figure 1:
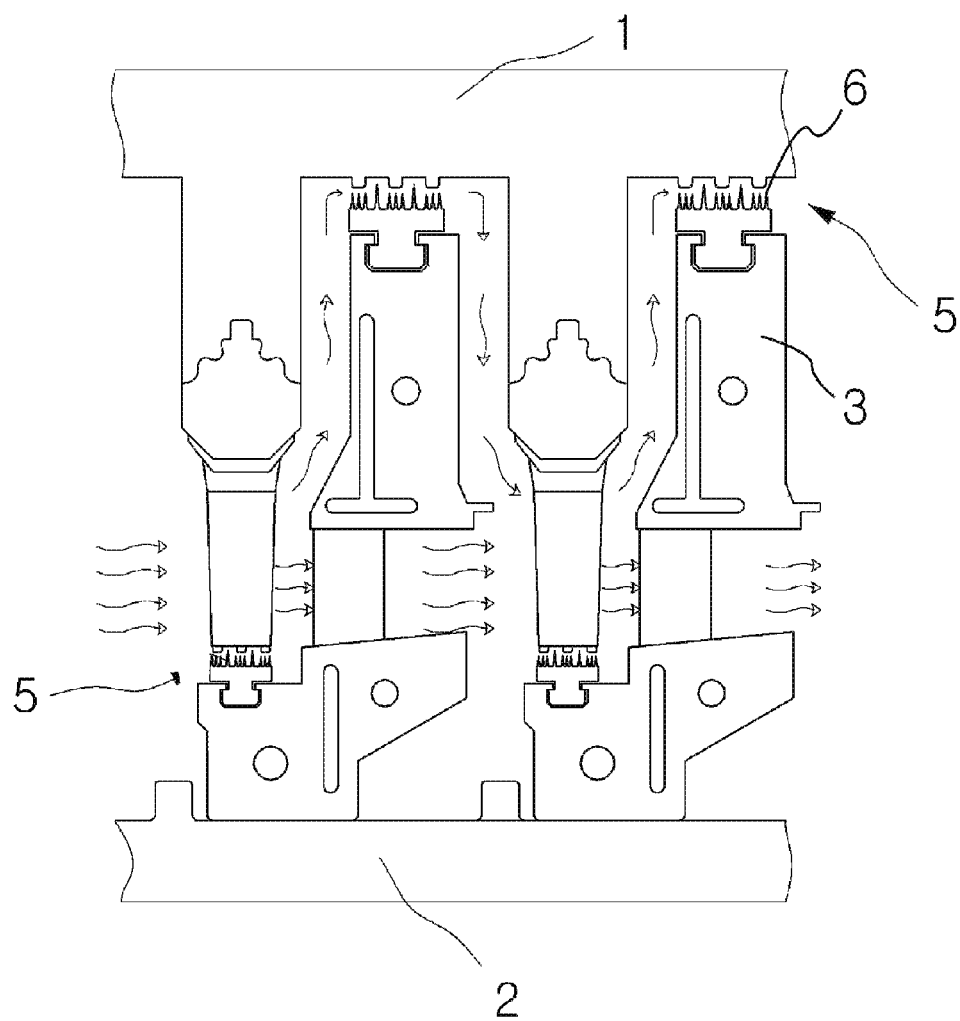
FIG. 1 is a sectional view illustrating a state in which a sealing device is mounted in a turbine.

The present invention relates to a method of manufacturing a labyrinth sealing device of a turbine using three-dimensional printing (hereinafter, called a '3D printing'). The method of manufacturing a labyrinth sealing device according to the present invention is characterized in that a labyrinth sealing device is mounted between a diaphragm 200 and a turbine rotor 100 of a turbine in order to induce smooth rotation of the turbine rotor 100 and prevent a leakage of gas by minimizing friction between a rotor, such as the turbine rotor 100, and a stator, such as the diaphragm 200, when the rotor rotates in the stator, wherein the labyrinth sealing device 300 includes a ring-shaped body 310 and a labyrinth part 320 protruding from one surface of the ring-shaped body 310, the ring-shaped body 310 is manufactured by centrifugal casting or ring mill, and the labyrinth part 320 is manufactured by 3D printing.

The ring-shaped body 310 and the labyrinth part 320 are stacked by ultrasonic vibration applied to the ring-shaped body 310 or stacked powder when they are stacked through laser cladding.

Furthermore, the ultrasonic vibration ranges from 2 KHz to 100 MHz.

Additionally, far-infrared rays may be applied to the ring-shaped body 310 or the stacked powder when they are stacked through laser cladding.

In addition, the far-infrared wavelength progresses within a range from 10 μm to 1000 μm so as to perform stacking through laser cladding while maintaining temperature of the ring-shaped body 310, which is a base material, within 25° C. to 900° C.

Hereinafter, the method of manufacturing a labyrinth sealing device using vibration and 3D printing according to the present invention will be described in detail with reference to the accompanying drawings.

Figure 2:
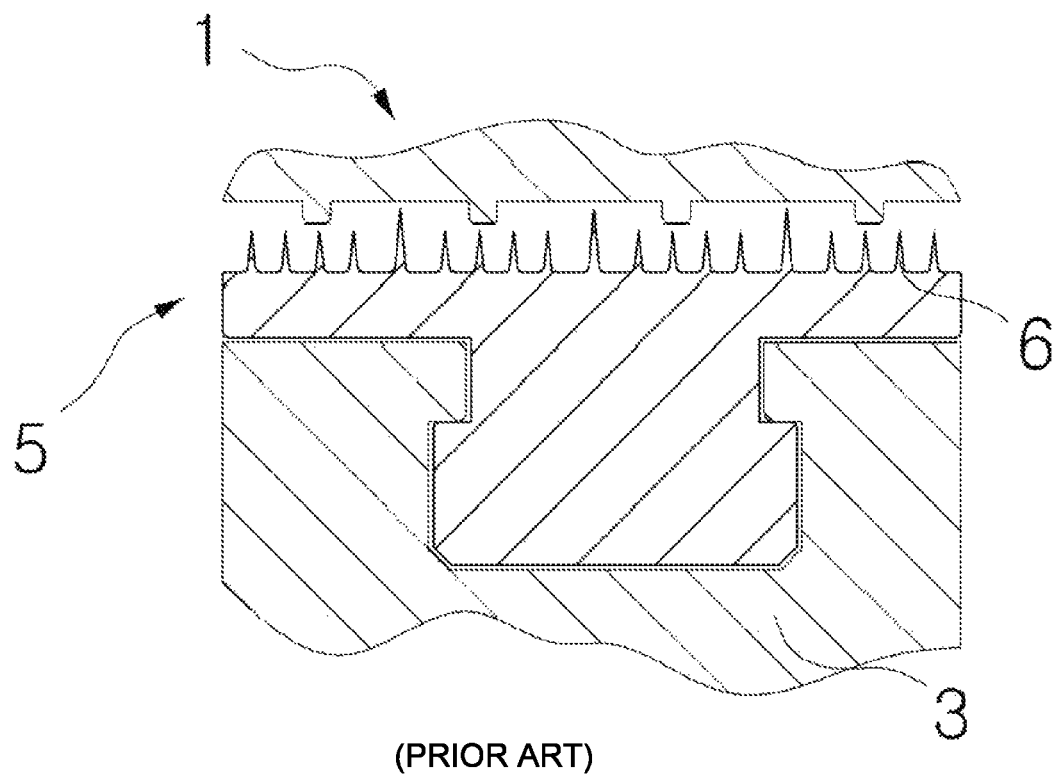
FIG. 2 is an enlarged view of a portion of FIG. 1.

FIG. 1 is a sectional view illustrating a state in which a sealing device is mounted in a turbine, and FIG. 2 is an enlarged view of a portion of FIG. 1.

As illustrated in FIGS. 1 and 2, a conventional labyrinth type sealing device 5 is installed between an outer ring and an inner ring of a diaphragm 3 mounted in a casing.

Here, the labyrinth type sealing device 5 has been widely used as a non-contact type annular sealing device of a turbine, and reduces a leakage flow rate by generating a throttling process in a fluid flowing in the turbine using sharp teeth 6.

That is, the teeth 6 are arranged in order in a flow direction of the fluid, thereby reducing a leakage flow rate of the fluid through a pressure drop effect generated while the fluid repeats expansion and contraction.

For more detailed contents, please refer to the Korean patent gazette of Korean Patent No. 10-1442739 (filed on Apr. 8, 2014 and granted on Sep. 15, 2014 by the same applicant of the present invention) described in the Background Art.

However, the conventional labyrinth type sealing device having the teeth 6 has several disadvantages in that materials are wasted severely while carving the labyrinth with a machining tool after the ring-shaped body is formed by centrifugal casting, and in that a manufacturing period is extended and productivity is not good since it is difficult to form the teeth.

Figure 3:
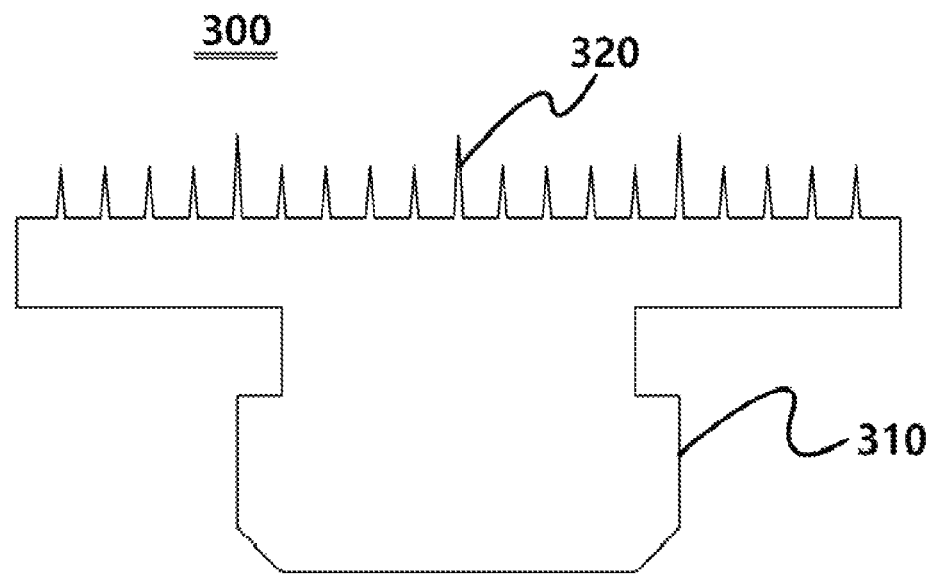
FIG. 3 is a sectional view of a labyrinth sealing device according to a method of manufacturing a labyrinth sealing device of a turbine using three-dimensional printing according to an embodiment of the present invention.
Figure 4:
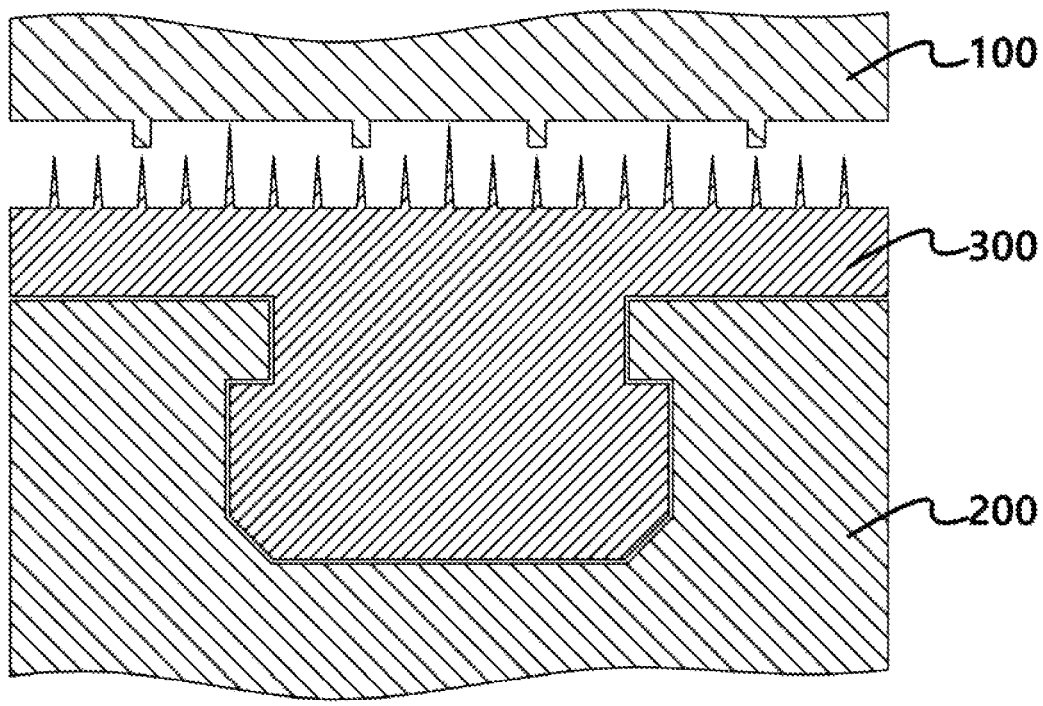
FIG. 4 is a partially enlarged sectional view illustrating a state in which the labyrinth sealing device according to the method of manufacturing a labyrinth sealing device using three-dimensional printing is mounted in a turbine.

FIG. 3 is a sectional view of a labyrinth sealing device according to a method of manufacturing a labyrinth sealing device of a turbine using three-dimensional printing according to an embodiment of the present invention, and FIG. 4 is a partially enlarged sectional view illustrating a state in which the labyrinth sealing device according to the method of manufacturing a labyrinth sealing device using three-dimensional printing is mounted in a turbine.

As illustrated in FIGS. 3 to 4, the present invention relates to a method of manufacturing a labyrinth sealing device 300 using 3D printing. The labyrinth sealing device 300 is mounted between a diaphragm 200 and a turbine rotor 100 of a turbine in order to induce smooth rotation of the turbine rotor 100 and prevent a leakage of gas by minimizing friction between a rotor such as the turbine rotor 100 and a stator such as the diaphragm 200 when the rotor rotates in the stator.

In general, the labyrinth sealing device 300 includes a ring-shaped body 310, and a labyrinth part 320 protruding from one surface of the ring-shaped body 310.

In the labyrinth sealing device 300 of the present invention, the ring-shaped body 310 is manufactured by centrifugal casting or ring mill, and the labyrinth part 320 is manufactured by 3D printing.

In this instance, the ring-shaped body 310 and the labyrinth part 320 are not integrally manufactured but are separately manufactured by different methods, and must be firmly coupled and bonded to each other by a stacking method such as laser cladding.

Accordingly, in the present invention, the ring-shaped body 310 and the labyrinth part 320 were bonded by applying ultrasonic vibration to the ring-shaped body 310 or stacked powder when they are stacked through laser cladding.

The ultrasonic vibration ranges from 2 KHz to 100 MHz.

More specifically, in order to transmit an optimal ultrasonic wave to the stacking unit, a vibrator (not shown) is attached to a place spaced within 0.5 to 2000 mm from the stacking unit to vibrate the ring-shaped body 310, which is a base material, to perform stacking through laser cladding.

That is, a vibrator comes into contact with the surface of the ring-shaped body 310 spaced apart within a distance of 0.5 mm to 2000 mm from a spot to be welded.

As described above, in a case in which the ring-shaped body 310 and the labyrinth part 320 are stacked through ultrasonic vibration and laser cladding, there is an advantage in that mechanical characteristics (hardness, intensity, abrasion, fatigue, and creep) are increased since the porosity of the stacked portion is reduced to 0.01% or less and the size of crystal grains is 50% less than that of the stacked portion by the conventional laser cladding.

In order to achieve stronger bonding relationship between the ring-shaped body 310 and the labyrinth part 320, far-infrared rays may be applied to the ring-shaped body 310 or the stacked powder.

In the case of an Inconel super heat resisting material having high melting temperature, laser cladding stacking is performed using far-infrared heater wavelength of 10 μm to 1000 μm while maintaining temperature of the base material within a range of 25° C. to 900° C.

Meanwhile, in the present invention, the ring-shaped body 310 may be made of a stainless steel material, and the labyrinth part 320 may be made of a material different from the stainless steel material.

In the present invention, since the labyrinth part 320 is manufactured by the following method, the labyrinth part 320 can be manufactured more conveniently by 3D printing, and the manufactured labyrinth part 320 can be firmly bonded to the ring-shaped body 310.

The shape of the ring-shaped body 310 is not limited to the shape illustrated in FIG. 3, and may have various shapes according to the shape of the diaphragm 200 corresponding to the body 310.

Figure 5:
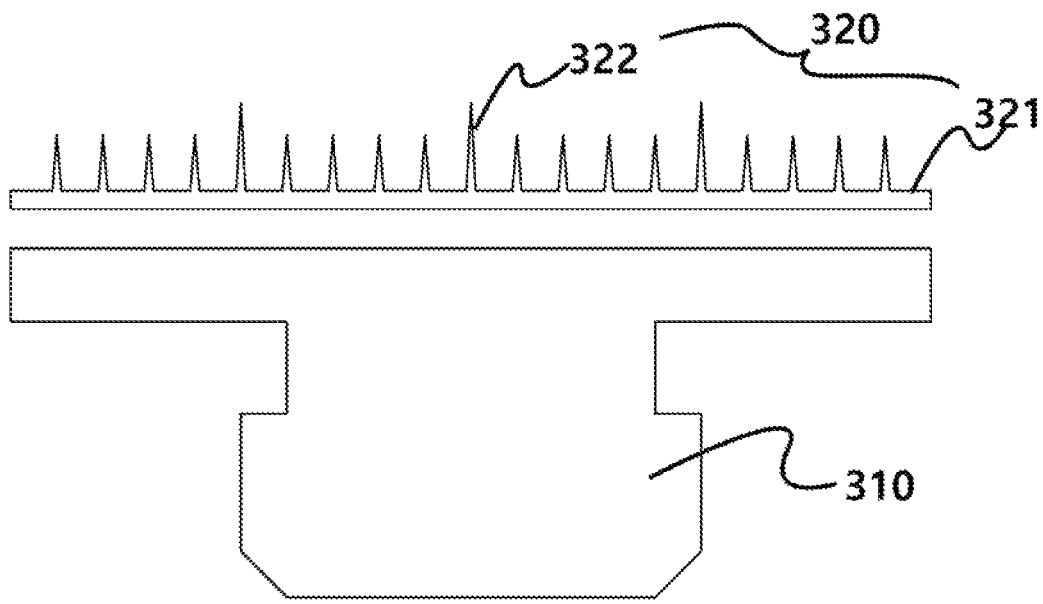
FIG. 5 is a sectional view of a labyrinth sealing device according to a method of manufacturing a labyrinth sealing device of a turbine using three-dimensional printing according to another embodiment of the present invention.

FIG. 5 is a sectional view of a labyrinth sealing device according to a method of manufacturing a labyrinth sealing device of a turbine using three-dimensional printing according to another embodiment of the present invention.

As illustrated in FIG. 5, the labyrinth part 320 according to another embodiment of the present invention includes a plate-shaped base 321 and a teeth part 322 protruding from one surface of the base 321.

The shape of the teeth part 322 may be manufactured in a brush shape or may be transformed into various shapes, such as a plurality of thin plate shapes.

The base 321 of the labyrinth part 320 gets in contact with the ring-shaped body 310, and then, is stacked or bonded in a stacking or bonding manner such as laser cladding, so that the labyrinth part 320 and the ring-shaped body 310 can have a firm bonding relationship.

Particularly, since the base 321 of the labyrinth part 320 of the present invention is made of the same material as the ring-shaped body 310, the labyrinth part 320 and the ring-shaped body 310 of the present invention can have the firm bonding relationship.

The teeth part 322 may be made of one selected from different materials from the base 321 depending on the material or shape of the turbine rotor 100 or performance of the turbine rotor 100.

Meanwhile, in order to have a stronger bonding relationship between the labyrinth part 320 and the body 310, a protrusion part (not shown) is formed on any one among contact surfaces that the base 321 and the body 310 get in contact with each other, and a groove part (not shown) corresponding to the protrusion part is formed on the other surface, so that the labyrinth part 320 and the body 310 can be assembled to each other like an assembly-type block and can be stacked or bonded by laser cladding.

The body 310, the base 321 and the teeth part 322 of the labyrinth part 320 according to the present invention can be modified or manufactured in various shapes within the scope of the present invention.

That is, the labyrinth sealing device 300 in the present invention is manufactured in such a way that the ring-shaped labyrinth body 310 is manufactured by centrifugal casting or ring mill and the labyrinth part 320 is stacked on the surface of the labyrinth body 310 by 3D printing, or in such a way that the labyrinth part 320 is separately manufactured by 3D printing and is bonded onto the labyrinth body 310.

In this instance, the labyrinth body 310 and the labyrinth part 320 are stacked or bonded by laser cladding.

As described above, the method of manufacturing a labyrinth sealing device of a turbine according to the present invention can improve productivity by reducing material costs and machining costs by manufacturing the labyrinth part (or teeth) protruding from the ring-shaped body using three-dimensional printing after manufacturing the ring-shaped body by centrifugal casting or ring mill. Moreover, the method of manufacturing a labyrinth sealing device can manufacture the labyrinth part in various shapes according to usage environments since the labyrinth part is manufactured by three-dimensional printing. Especially, the method of manufacturing a labyrinth sealing device can achieve microstructure, reduce fusion defects, and improve an adhesive force by bonding the labyrinth part on the body through vibration and far-infrared heating when the labyrinth part is stacked on the body.

What is claimed is:

1. A method of manufacturing a labyrinth sealing device mounted between a diaphragm and a turbine rotor of a turbine in order to induce smooth rotation of the turbine rotor and prevent a leakage of gas by minimizing friction between a rotor, such as the turbine rotor, and a stator, such as the diaphragm, when the rotor rotates in the stator, wherein the labyrinth sealing device includes a ring-shaped body and a labyrinth part protruding from one surface of the ring-shaped body, the ring-shaped body is manufactured by centrifugal casting or ring mill, and the labyrinth part is manufactured by 3D printing, wherein the ring-shaped body and the labyrinth part are stacked by ultrasonic vibration applied to the ring-shaped body or stacked powder when they are stacked through laser cladding, wherein when stacking through laser cladding, the ring-shaped body and the labyrinth part are stacked while applying ultrasonic vibration and far infrared rays between 2 KHz and 100 MHz to the ring-shaped body or stacked powder, wherein the far infrared wavelength proceeds between 10-1000 μm and is stacked through laser cladding while maintaining the temperature of the ring-shaped body as the base material within 25-900° C., wherein the labyrinth part includes a plate-shaped base and a teeth part protruding from one surface of the base, wherein the labyrinth part allows the base of the labyrinth part to come into contact with the ring-shaped body, and then is stacked or bonded by a lamination or bonding method such as laser cladding, and by manufacturing the base of the labyrinth part of the same material as the ring-shaped body, the labyrinth part and the ring-shaped body can have a firm bounding relationship, wherein a protrusion is formed on one of the surfaces of the base and the body in contact with each other, and a groove corresponding to the protrusion is formed on the other, assembled and bonded like an assembly block, so that the labyrinth part and the body have the firm bounding relationship.

* * * * *